United States Patent [19]

Demisch et al.

[11] Patent Number: 5,040,416

[45] Date of Patent: Aug. 20, 1991

[54] ELECTRICAL CURRENT FLOW SENSOR

[75] Inventors: Ulrich Demisch, Freiburg; Peter Oberle, Hufingen; Martin Rombach, Lenzkirch, all of Fed. Rep. of Germany

[73] Assignee: Testoterm Messtechnik GmbH & Co., Lenzkirch, Fed. Rep. of Germany

[21] Appl. No.: 368,567

[22] Filed: Jun. 20, 1989

[30] Foreign Application Priority Data

Jun. 21, 1988 [DE] Fed. Rep. of Germany ....... 3820853

[51] Int. Cl.$^5$ .................................................. G01F 1/68
[52] U.S. Cl. ................................ 73/204.22; 73/204.25
[58] Field of Search ........... 73/204.15, 204.17, 204.23, 73/204.25, 204.27, 204.22

[56] References Cited

U.S. PATENT DOCUMENTS

| | | | |
|---|---|---|---|
| 3,199,348 | 8/1965 | Salera | 73/204.22 |
| 3,246,515 | 4/1966 | Martino et al. | 73/204.22 |
| 3,372,590 | 3/1968 | Sterling | 73/204.17 |
| 4,059,982 | 11/1977 | Bowman | 73/204.17 |
| 4,480,467 | 11/1984 | Harter et al. | 73/204.15 |

OTHER PUBLICATIONS

Irommelin et al., "Modified Annemometers for Indoor Climate Research" in Journal of Physics F, vol. 9, No. 11, 1976, pp. 1005-1009.

*Primary Examiner*—Herbert Goldstein
*Attorney, Agent, or Firm*—Lackenbach Siegel Marzullo & Aronson

[57] ABSTRACT

An electical current flow sensor, where a spherical surface thereof is subjected to an in-flowing fluid in order to the speed of the fluid. The spherical surface is formed by a body made of a good thermally conductive material. An electrical resistor is disposed in a cavity in the interior of the body of good thermally conductive material. The electrical resistor is placed in a good heat exchange with the wall of the cavity. The electrical resistor is adjusted to a preset temperature by electrical current feed, whereby increased fed-in electrical current is measured and serves as a measure for the current flow speed.

5 Claims, 1 Drawing Sheet

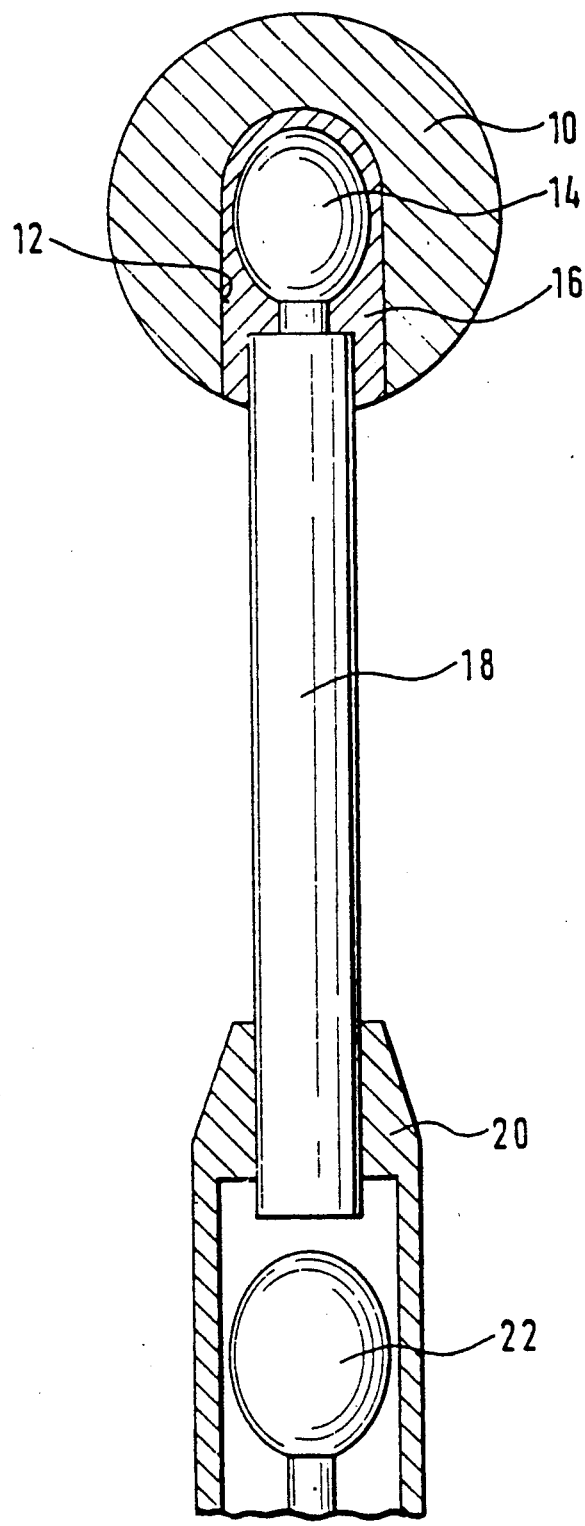

ELECTRICAL CURRENT FLOW SENSOR

The invention relates to an electrical current operated fluid flow sensor.

Conventional electrical current flow sensors of this kind are employed in many cases for measuring of fluid flow conditions, for example, of the air in air-conditioned rooms. In such a situation, an electrical resistor is heated to a temperature above the temperature of the inflowing air or of another in-flowing fluid, for example, to 100° C. The current flow then cools this resistor such that its resistance value changes. Electrical current is now fed via an electronic control for such a time until the current flow sensor reaches again the constant temperature of 100° C. The fed-in electrical current serves as a measure for the fluid flow speed. The resistor being subjected to the air current flow.

In particular, in the context of the measurement of fluid flow conditions of the air in air-conditioned rooms, for which such a measurement apparatus is used in many cases, the fluid flow direction of the air changes continuously such that the measurement results are not true and erroneous in cases where the fluid flow sensor provided is not a direction-independent device. Fluid flow sensors with an angular or irregular outer shape are cooled to different degrees depending on the direction from which the fluid flows onto the sensors. Thus, different measurement results can occur in case of different fluid flow directions. A fluid flow sensor can only be sufficiently independent of direction if the sensor is substantially ball-shaped i.e. of spherical shape.

For this reason, in the case of a known fluid flow sensor of the initially recited kind, balls have been employed which were coated by vapor-deposition with a thin metal layer employing the thin-layer technology, which thin metal layer, as an electrical conductor, can heat the ball and also simultaneously measure the electrical resistance of the layer. The production of these fluid flow sensors, however, is very involved and consequently very expensive.

In case of other known measurement apparatus, the current flow sensor comprises a negative temperature coefficient NTC resistor commercially available.

The negative temperature coefficient NTC resistors, conventionally available from commercial sources, are however not of rotation symmetrical shape and therefore result in inaccurate measurements. In addition, the negative temperature coefficient NTC resistors are hung extremely delicate and fragile at their electrical connection lines in order to avoid a changing of the in-flow conditions.

Therefore, it is an object of the invention to furnish an electrical current operated fluid flow sensor, which measures the speed of the fluid substantially independently of the fluid flow direction of the fluid, which electrical current operated fluid flow sensor, however, can be produced at comparatively favorable cost.

This object is achieved, in case of a fluid flow sensor of the initially recited kind, which comprises a substantially spherically shaped housing formed of a high thermal conductivity metal which has a cavity extending from its surface which contains an electrical resistor which is in heat exchange with the surface of the spherically shaped housing.

The invention current flow sensor exhibits outwardly a rotation symmetrical shape, i.e. a spherical shape, such that measurements can be performed substantially independent of the fluid flow direction of the in-flowing fluid. The components of the fluid flow sensor, for example, a metal ball or the like, and a conventional electrical resistor, are relatively inexpensive, the production method of the current flow sensor is not complicated, and consequently the fluid flow sensor can be produced at favorable cost.

In addition, the invention fluid flow sensor is characterized by a comparatively high mechanical stability and sturdiness, since the electrical resistor is disposed in the interior of the rotation symmetrical body and, consequently, the electrical resistor is not directly subjected to mechanical loads as compared to the current flow sensor known in the state of the art.

Additional to advantageous features of the invention are described hereinbelow.

The use of a negative temperature coefficient NTC resistor is particularly advantageous, since the resistance value of the negative temperature coefficient NTC resistor is markedly changeable at small temperature variations, which increases the measurement accuracy in contrast to the resistors employed in thin-layer technology.

The high cost of thin-layer technology can be avoided according to fluid flow sensors according to this invention using a negative temperature coefficient resistor or a metal film resistor, where nearly the same properties are achieved relative to the measurement accuracy. In other respects, the negative temperature coefficient NTC resistor is very well known based on its technical data. Furthermore, according to the invention structure, the hanging and supporting of the negative temperature coefficient NTC resistor is substantially without load subjection.

It is to be assured, based on the use of a surrounding metal adhesive 16 which fills cavity 12 that a good heat exchange is furnished between the rotation symmetric i.e. spherical body and the resistor.

An advantageous support of the fluid flow sensor is support rod 18.

A favorable size of the sensor is a diameter of 2 to 6 mm and, a variation of the temperature of the in-flowing fluid is compensated by a second resistor 22 disposed in a casing 20.

An embodiment of the invention is illustrated in more detail in the drawing. The figure illustrates a longitudinal sectional view of the electrical current flow sensor.

A ball 10 is subjected to the in-flowing room air or, respectively, other gases or liquids. It is made out of a good thermally-conductive metal, in order to transfer a cooling, based on outside air, quickly to a negative temperature coefficient NTC resistor 14. The negative temperature coefficient NTC resistor 14 is disposed in a blind bore recess or cavity 12 inside of the ball 10. A conductive silver adhesive 16 furnishes a thermally conductive connection between the resistor 14 and the ball 10 and allows the heat exchange between the ball 10 and the negative temperature coefficient NTC resistor 14. A thermally conductive connection can, however, also be furnished by other appropriate means.

Since the ball 10 has a diameter of only about 5 mm, the cooling, based on air flow current, is sufficiently quickly transferred inwardly to the negative temperature coefficient NTC resistor, such that the resistance value of the negative temperature coefficient NTC resistor changes.

The negative temperature coefficient NTC resistor 14 is attached to a support rod 18 carrying the ball 10. The support rod 18 protrudes out of a casing 20, where a second negative temperature coefficient NTC resistor 22 is disposed in the casing 20. This second negative temperature coefficient NTC resistor 22 has the purpose to compensate the influence of the air temperature onto the measurement results of the negative temperature coefficient conductivity NTC resistor 14 disposed in the ball 10. The temperature compensation can however also be effected by different ways and means.

We claim:

1. Electrical current operated fluid flow sensor comprising a housing having a cavity therein and having a substantially spherical surface formed of a thermally conductive metal and adapted to be subjected to a flowing fluid; a casing; a support rod protruding from said casing and supporting said housing; a first resistor disposed in said casing for compensating temperature in said casing; and a second resistor at a preset temperature attached at said support rod within said cavity and in heat exchange with the spherical surface of said housing, such that a temperature decrease at the spherical surface and at the second resistor due to cooling by the flow of fluid surrounding the housing can be offset by passing electrical current through said second resistor to raise the temperature thereof to said pre-set temperature and thereby provide a measure of speed of the fluid flow.

2. Electrical current-operated fluid flow sensor according to claim 1, wherein the electrical resistor is furnished by a negative temperature coefficient NTC resistor or a metal film resistor.

3. Electrical current-operated fluid flow sensor according to claim 1 wherein the electrical resistor is connected via a conductive metal adhesive (16) to the wall of the cavity of said spherical surface housing (12).

4. Sensor in accordance with claim 3 in which said metal adhesive is silver metal adhesive.

5. Electrical current-operated fluid flow sensor according to claim 1 wherein the spherical surface housing a diameter of from 2 to 6 mm, and preferably of 5 mm.

* * * * *